(12) United States Patent
Yamamoto et al.

(10) Patent No.: US 6,675,994 B2
(45) Date of Patent: Jan. 13, 2004

(54) FLUID SQUIRT GUN

(75) Inventors: Hitoshi Yamamoto, Tsukuba-gun (JP);
Kouichiro Ishibashi, Tsukuba-gun (JP);
Kenji Fukushima, Tsukuba-gun (JP)

(73) Assignee: SMC Corporation, Tokyo (JP)

( * ) Notice: Subject to any disclaimer, the term of this patent is extended or adjusted under 35 U.S.C. 154(b) by 33 days.

(21) Appl. No.: 10/103,712

(22) Filed: Mar. 25, 2002

(65) Prior Publication Data

US 2002/0148862 A1 Oct. 17, 2002

(30) Foreign Application Priority Data

Apr. 13, 2001 (JP) ........................................ 2001-115768

(51) Int. Cl.[7] ................................................. B67D 5/34
(52) U.S. Cl. ........................ 222/509; 222/518; 251/282; 239/526; 239/583
(58) Field of Search ................................ 222/505, 509, 222/578, 380; 251/282, 339; 239/525, 526, 583

(56) References Cited

U.S. PATENT DOCUMENTS 3,294,362 A * 12/1966 Schultz et al. ............... 251/239
3,866,838 A * 2/1975 Miles ........................... 239/372
4,083,497 A * 4/1978 Rosenberger ................ 239/526
5,803,313 A * 9/1998 Flatt et al. ................. 222/146.5

* cited by examiner

Primary Examiner—Gene Mancene
Assistant Examiner—Patrick Buechner
(74) Attorney, Agent, or Firm—Oblon, Spivak, McClelland, Maier & Neustadt, P.C.

(57) ABSTRACT

A fluid squirt gun includes a linear flow path provided in a barrel, a nozzle at a tip end of the flow path, a valve seat provided in the flow path, a valve element disposed for movement in an axial direction of the flow path to open and close the valve seat, a spring for pressing the valve element in a valve-closing direction, and a trigger for opening and closing the valve element. The valve element includes a forward pressure receiving face on which fluid in the flow path acts in a valve-opening direction in a closed state of a valve and a reverse pressure receiving face on which the fluid acts in the valve-closing direction in the closed state of the valve and both the pressure receiving faces have substantially equal pressure receiving areas.

7 Claims, 7 Drawing Sheets

FLUID SQUIRT GUN

TECHNICAL FIELD

The present invention relates to a fluid squirt gun for squirting fluid from a nozzle for removal of foreign matter stuck to a surface of a workpiece and the like.

PRIOR ART

This type of fluid squirt gun is generally formed such that a valve seat in a flow path is opened and closed with a valve element and that seating force in closing of the valve element is obtained by fluid pressure. Such a prior-art fluid squirt gun is advantageous in that a spring for valve closing is unnecessary because the valve element is closed by fluid pressure. However, if pressure of fluid becomes large, the seating force of the valve element on the valve seat becomes large. Moreover, the seating force of the valve element varies due to variations in the fluid pressure. If the fluid pressure varies, the valve element may be excessively pressed against the valve seat to reduce durability of the valve seat.

Furthermore, because the flow path of the fluid in the gun opened and closed with the valve element is not linear, a pressure loss is large and an effective cross-sectional area of the flow path is small due to bends of the flow path to thereby increase the pressure loss.

DISCLOSURE OF THE INVENTION

It is an object of the present invention to provide a fluid squirt gun in which a seating force for pressing a valve element against a valve seat can be obtained by repulsing force of a spring irrespective of pressure of fluid to thereby prevent the seating force from being affected by variations in fluid pressure and achieve a stable closed state of a valve and which has improved durability.

It is another object of the invention to provide a fluid squirt gun in which a flow path of fluid in a barrel is formed in a linear shape to eliminate bends and a reduction in an effective cross-sectional area of the flow path even in an opening/closing portion of the valve element to thereby suppress a pressure loss.

To achieve the above objects, a fluid squirt gun of the invention comprises, a linear flow path provided in a barrel, a nozzle at a tip end of the flow path, a valve seat provided in the flow path, a valve element disposed for movement in an axial direction of the flow path to open and close the valve seat, a spring for pressing the valve element in a valve-closing direction, and a trigger for opening and closing the valve element, wherein the valve element includes a forward pressure receiving face on which fluid in the flow path acts in a valve-opening direction in a closed state of a valve and a reverse pressure receiving face on which the fluid acts in the valve-closing direction in the closed state of the valve and both the pressure receiving faces have substantially equal pressure receiving areas.

In the fluid squirt gun having the above structure, because fluid pressure operating force acting on the valve element in the valve-closing direction and fluid pressure operating force acting on the valve element in the valve-opening direction in the closed state of the valve element are equal to each other, the seating force for bringing the valve element into contact with the valve seat can be obtained by only the repulsing force of the spring. Therefore, the seating force is not affected at all by variations in the fluid pressure, the stable closed state of the valve can be obtained, and problems such as reduction of durability of the valve seat and the valve element due to variations in the seating force are not caused. Furthermore, because the flow path of the fluid in the barrel is formed in the linear shape, there is not a bend of the flow path or a reduction in the effective cross-sectional area even in the opening/closing portion of the valve element and the pressure loss is not generated.

According to a concrete structural form of the invention, the valve element includes a received pressure adjusting portion for sliding in a sealed state in the flow path in a position upstream from the valve seat, a valve portion for opening and closing the valve seat from a down stream side, a stem connecting the valve portion and the received pressure adjusting portion, and a through hole provided in the received pressure adjusting portion to connect a flow path portion upstream from the received pressure adjusting portion and a flow path portion downstream from the received pressure adjusting portion and the forward pressure receiving face and the reverse pressure receiving face are formed such that fluid pressure operating force in the valve-closing direction and generated by the received pressure adjusting portion and fluid pressure operating force in the valve-opening direction and acting on the stem and the valve portion are equal to each other.

In this case, the received pressure adjusting portion is formed with a pressure receiving face facing an upstream side and a pressure receiving face facing a downstream side, the forward pressure receiving face is formed of the pressure receiving face of the received pressure adjusting portion facing the upstream side and pressure receiving faces of the stem and the valve portion, and the reverse pressure receiving face is formed of the pressure receiving face of the received pressure adjusting portion facing the downstream side.

According to a further concrete structure of the invention, the received pressure adjusting portion includes a small-diameter portion for forming the pressure receiving face facing the upstream side and a large-diameter portion for forming the pressure receiving face facing the downstream side. The small-diameter portion of the received pressure adjusting portion and the valve portion have substantially the same diameters. In the barrel, an operating chamber sealed from the flow path is provided around the flow path. A part of the received pressure adjusting portion of the valve element is disposed in the operating chamber and the trigger is in contact with the part.

According to another concrete structural form of the invention, the valve seat is in a disc shape, has an annular seat portion at an outer periphery of the valve seat, and disposed concentrically with the flow path in a central portion of the flow path. The valve element is in a hollow tubular shape, has small-diameter portions having inside diameters substantially the same as a seat diameter of the valve seat on axial opposite sides of the valve element and a large-diameter portion having an inside diameter larger than the seat diameter between the small-diameter portions, is disposed in such a position as to surround the valve seat to be movable in the axial direction of the flow path, has a valve portion formed of the small-diameter portion positioned downstream from the large-diameter portion and the forward pressure receiving face and the reverse pressure receiving face on an inner face of the large-diameter portion.

In the barrel, an operating chamber sealed from the flow path is provided around the flow path. A projecting portion formed on an outer periphery of the valve element is disposed in the operating chamber and the trigger and the spring are in contact with the projecting portion.

DETAILED DESCRIPTION

Figure 1:
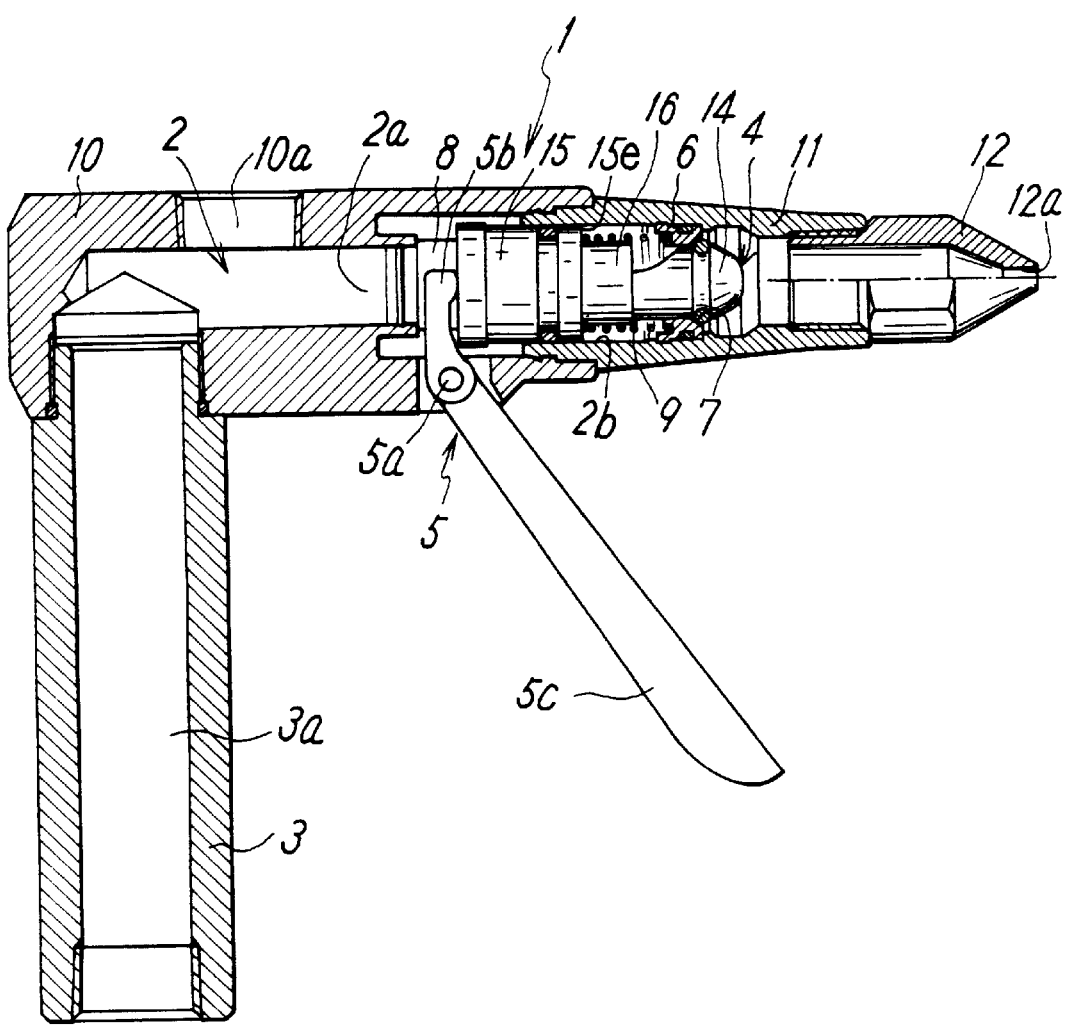
FIG. 1 is a sectional view of a first embodiment of the present invention.
Figure 2:
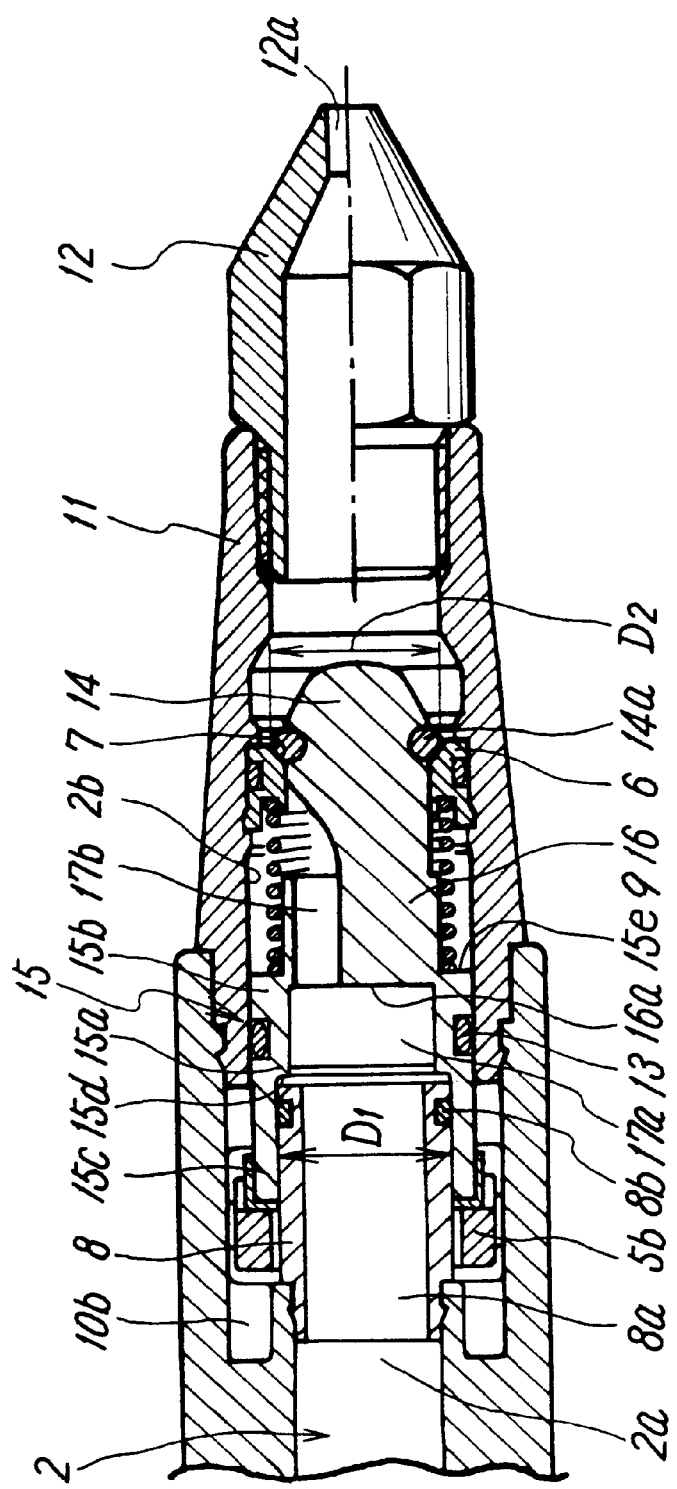
FIG. 2 is an enlarged sectional view of an essential portion.

FIGS. 1 to 4 show a structure of a first embodiment of a fluid squirt gun of the present invention. This fluid squirt gun includes a barrel 1 having inside thereof a linear flow path 2 extending in an axial direction, a handle 3 having inside thereof a supply path 3a communicating with the flow path 2 to supply fluid, a valve element 4 provided to a central portion of the flow path 2 of the barrel 1 to be able to slide in the axial direction of the barrel, an annular valve seat 7 fixedly provided in the flow path 2 to be opened and closed with the valve element 4, and a trigger 5 for driving the valve element 4.

The barrel 1 includes a barrel base end portion 10 to which the handle 3 is connected and a barrel tip end portion 11 connected to the barrel base end portion 10. A nozzle 12 is detachably mounted to a tip end of the barrel tip end portion. 11 and a squirt hole 12a for squirting fluid such as compressed air or various liquids is provided to a tip end of the nozzle 12.

In the barrel base end portion 10, the flow path 2 extends to a position where the handle 3 is connected and the flow path 2 communicates with the supply path 3a in the handle 3 in this position. A fluid supply hole 10a communicating with the flow path 2 is provided to an upper face of the barrel base end portion 10 and fluid can be supplied through the fluid supply hole 10a if the supply path 3a in the handle 3 is not used.

In the barrel tip end portion 11, an annular valve seat member 6 having the valve seat 7 is fixed and the valve element 4 for opening and closing the valve seat 7 is disposed astride the barrel tip end portion 11 and the barrel base end portion 10.

The valve element 4 includes a cylindrical received pressure adjusting portion 15 for sliding in a sealed state in the flow path 2 in a position upstream from the valve seat 7, a substantially disc-shaped valve portion 14 for opening and closing the valve seat 7 from a downstream side, a stem 16 for connecting the valve portion 14 and the received pressure adjusting portion 15 to each other, and through holes 17a and 17b for connecting a flow path portion 2a upstream from the received pressure adjusting portion 15 and a flow path portion 2b downstream from the received pressure adjusting portion 15. The valve portion 14 has a circular sectional shape and has a sealing member 14a on an outer periphery of the valve portion 14. The sealing member 14a comes in contact with and separates from the valve seat 7 from a downstream side to open and close the valve seat 7.

The received pressure adjusting portion 15 includes, in the flow path 2, a small-diameter portion 15a for forming a pressure receiving face facing an upstream side and indicated with a diameter $D_1$ and a large-diameter portion 15b for forming a pressure receiving face facing a down stream side. The pressure receiving face of the received pressure adjusting portion 15 facing the upstream side and pressure receiving faces of the stem 16 and the valve portion 14 form a forward pressure receiving face on which fluid in the flow path 2 acts in a valve-opening direction in valve closing. The pressure receiving face of the received pressure adjusting portion 15 facing the downstream side forms a reverse pressure receiving face on which fluid in the flow path 2 acts in a valve-closing direction in valve closing. The forward pressure receiving face and the reverse pressure receiving face are formed to have substantially equal pressure receiving areas.

At an upstream end portion of the received pressure adjusting portion 15, an extension 15c having the same diameter as the large-diameter portion 15b extends upstream from the small-diameter portion 15a and is fitted over an outer face of a tubular guide 8 fixed to a barrel base end portion 10 such that the extension 15c can slide in a sealed state. This structure forms the small-diameter portion 15a at the upstream end portion of the received pressure adjusting portion 15.

Although the diameter $D_1$ of the small-diameter portion 15a and a sealing diameter $D_2$ of the valve portion 14 are formed to be equal to each other, they may be different from each other.

In the drawings, a reference numeral 13 designates a sealing member for airtightly providing sealing between an outer peripheral face of the large-diameter portion 15b of the received pressure adjusting portion 15 and an inner peripheral faces of the barrel tip end portion 11, 8a designates a through hole in the guide 8 and forming a part of the flow path 2, and 8b designates a sealing member for airltightly providing sealing between an outer peripheral face of the guide 8 and an inner peripheral face of the extension 15c.

On the other hand, the stem 16 is formed to be smaller than the small-diameter portion 15a and the valve portion 14 and the through hole 17b is formed at a side portion of the stem 16.

In the flow path portion 2b downstream from the received pressure adjusting portion 15, a spring 9 for valve closing is provided between the received pressure adjusting portion 15 and the valve seat member 6. The valve element 4 is constantly biased by the spring 9 in such a direction as to close the valve seat 7 with the valve portion 14.

Figure 3:
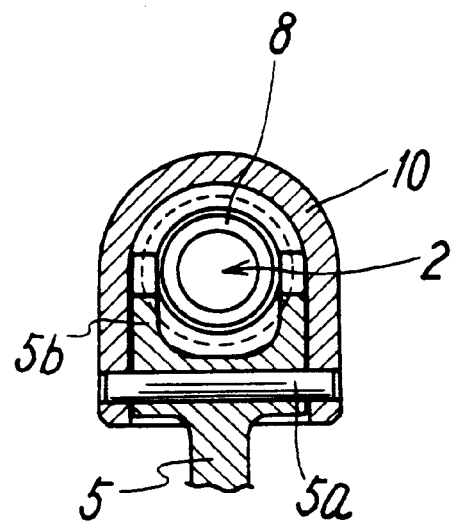
FIG. 3 is a cross-sectional view of a trigger portion.

An operating chamber 10b which the extension 15c of the received pressure adjusting portion 15 faces is provided outside the guide 8 mounted to the barrel base end portion 10. A tip end portion 5b of the trigger 5 is inserted into the operating chamber 10b and the trigger 5 is in contact with an end portion of the extension 15c. An intermediate portion of the trigger 5 is pivoted about a shaft 5a on the barrel 1. As shown in FIG. 3, the tip end portion 5b positioned in the operating chamber 10b is formed into a substantially Y shape and the Y-shaped portion is positioned astride a lower half portion of the guide 8 and is in contact with the extension 15c. The operating chamber 10b is not especially sealed and open outside under atmospheric pressure.

Figure 4:
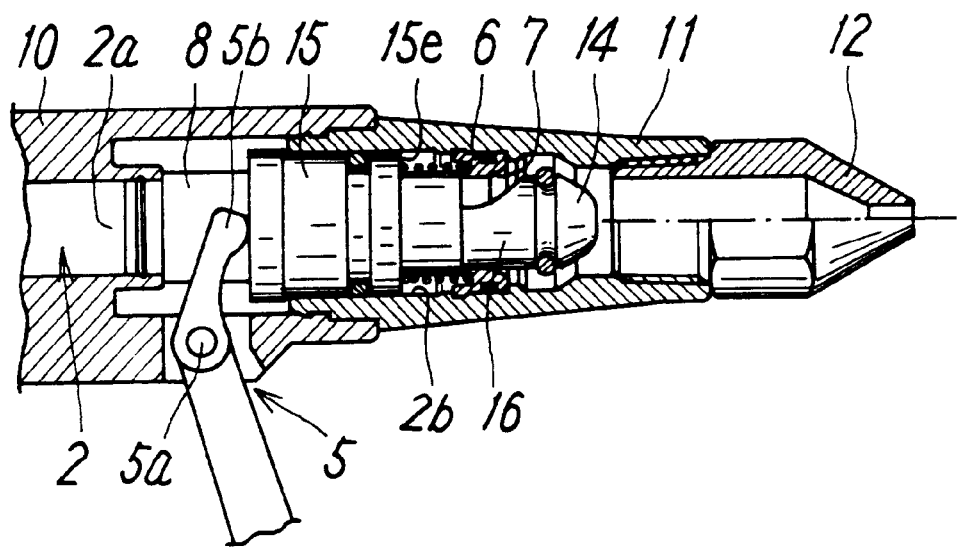
FIG. 4 is a vertical sectional view of an essential portion in a state in which a valve is open.

The trigger 5 directly presses the valve element 4 in a direction against the spring 9 on a principle of a lever to separate the valve portion 14 from the valve seat 7 from the valve seat 7 and open the valve as shown in FIG. 4 by pushing an operating portion 5c at a lower end of the trigger 5 toward the handle 3 and rotating the operating portion 5c about the shaft 5a. If the trigger 5 is released, the valve seat 7 is closed with the valve element 4 by repulsing force of the spring 9.

In valve closing of the valve element 4, fluid pressure operating force in a valve-opening direction and fluid pressure operating force in a valve-closing direction act on the valve element 4. The operating force in the valve-opening direction is generated by fluid pressure acting on the forward pressure receiving faces such as an end face 15d of the small-diameter portion 15a in the received pressure adjusting portion 15, an end face 16a of the stem 16, and a pressure receiving face of the valve portion 14 facing the upstream side. The operating force in the valve-closing direction is generated by fluid pressure acting on the reverse pressure receiving faces such as an end face 15e of the large-diameter portion 15b facing the downstream side. However, because pressure receiving areas of the forward pressure receiving faces and the reverse pressure receiving faces are adjusted by the received pressure adjusting portion 15 to be equal to each other, the operating force in the valve-opening direction and the operating force in the valve-closing direction are equal to each other. As a result, only the repulsing force of the spring 9 substantially acts on the valve element 4.

Therefore, seating force of the valve element 4 is not affected at all by variations in fluid pressure and a closed state of the valve is maintained only by the repulsing force of the spring 9. As a result, the stable closed state of the valve can be obtained and a problem such as reduction in durability of the valve seat 7 and the valve element 4 due to variations in the seating force is not caused. Because the flow path of fluid in the barrel is formed in a linear shape, there is not a bend or a reduction in an effective cross-sectional area of the flow path even in an opening/closing portion of the valve element and a pressure loss is not caused.

As a variation of the first embodiment, it is possible to form a structure in which the small-diameter portion 15a is omitted. In other words, in FIG. 2, it is possible that the through hole 17a extends to a position of an end portion of the extension 15c and that the guide 8 slides in the through hole 17a. In this case, the reverse pressure receiving face 15e of the large-diameter portion 15b is formed to have a pressure receiving area equal to that of the forward pressure receiving faces of the stem 16 and the valve portion 14.

Figure 5:
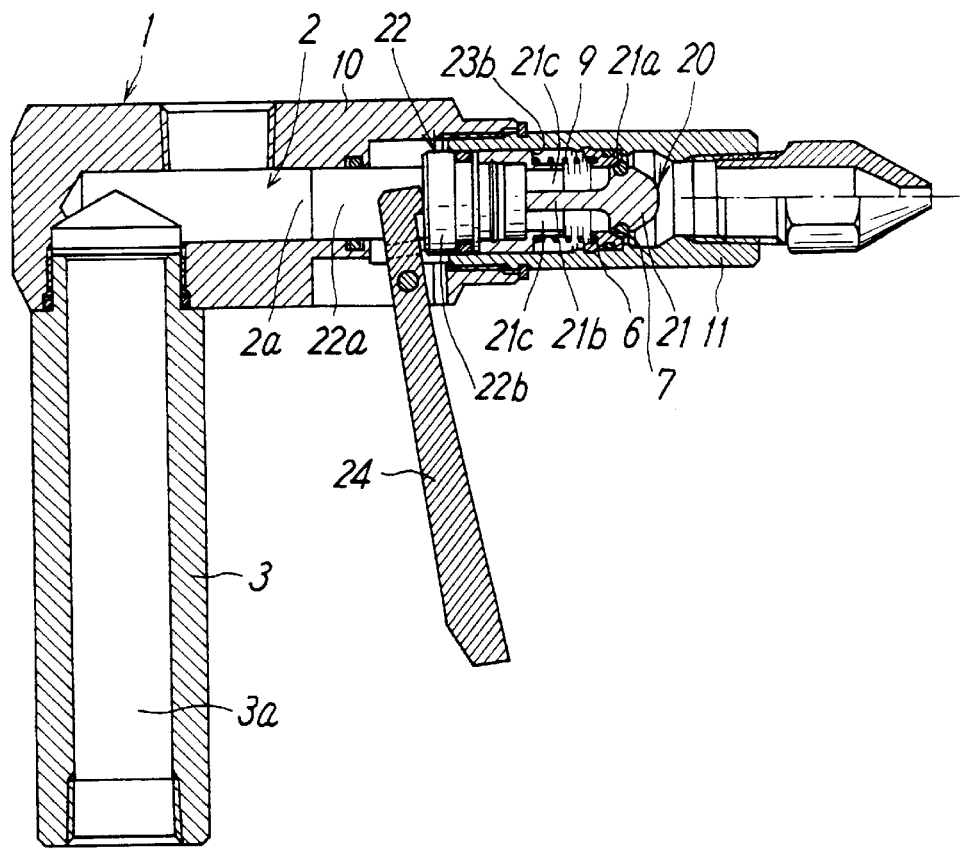
FIG. 5 is a sectional view of a second embodiment of the invention.
Figure 7:
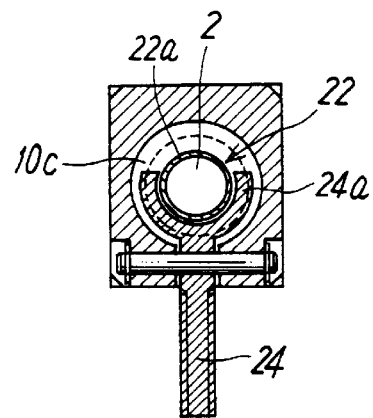
FIG. 7 is a cross sectional view of a trigger portion.
Figure 6:
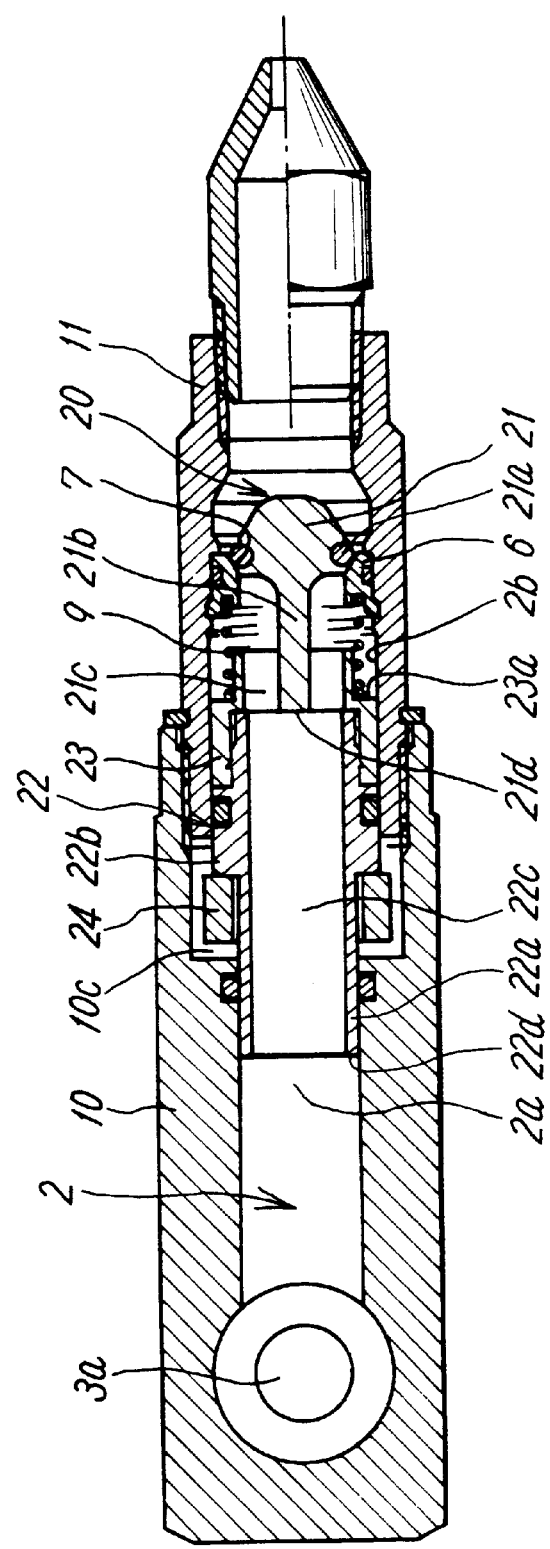
FIG. 6 is a horizontal sectional view of the second embodiment.

FIGS. 5 to 7 show a second embodiment of the invention. A fluid squirt gun of the second embodiment is different from the first embodiment in a structure of a valve element 20. To put it concretely, a received pressure adjusting portion 22 of the valve element 20 has a small-diameter portion 22a extending upstream in the flow path 2 and the small-diameter portion 22a is supported to be able to directly slide in the barrel base end portion 10 to thereby omit the guide 8 provided to the first embodiment. A through hole 22c in a uniform size is provided in the received pressure adjusting portion 22.

A valve portion 21 of the valve element 20 is mounted to a hollow connecting member 23 mounted on a downstream end side of the received pressure adjusting portion 22 through a thin stem 21b. The connecting member 23 has the same diameter as a large-diameter portion 22b of the received pressure adjusting portion 22 and forms a part of the reverse pressure receiving faces. The valve portion 21 has an annular sealing member 21a at a portion of the valve portion 21 in contact with the valve seat 7 of the valve seat member 6. A base end portion of the stem 21b is supported in a plurality of directions at a central portion of the connecting member 23 by a plurality of thin-plate-shaped bridges 21c positioned radially around the stem 21b and in parallel to an axis of the flow path.

In this embodiment, the forward pressure receiving faces formed of an end face 22d of the small-diameter portion 22a, an end face 21d of the stem 21b, and the pressure receiving face of the valve portion 14 and the reverse pressure receiving faces mainly formed of an end face 23a of the connecting member 23 are similarly formed to have equal pressure receiving areas.

A trigger 24 is disposed such that a substantially Y-shaped tip end portion 24a is positioned along an outer periphery of the small-diameter portion 22a of the received pressure adjusting portion 22 as shown in FIG. 7.

Because the fluid squirt gun of the second embodiment does not include the guide 8 provided to the first embodiment by supporting the small-diameter portion 22a of the received pressure adjusting portion 22 for direct sliding in the barrel base end portion 10, it is possible to form the flow path 2 in the barrel 1 into the linear shape with few steps. Because the stem 21b is formed in a thin shape, disposed at the central portion of the connecting member 23, and connected by the thin-plate-shaped bridges 21c, the number of bends of the flow path 2 is reduced in this portion to thereby prevent reduction in an effective cross-sectional area and to reduce a pressure loss.

Because structures and operations other than those described above are substantially similar to those of the first embodiment, main corresponding portions are provided with the same reference numerals to omit descriptions of them.

Figure 8:
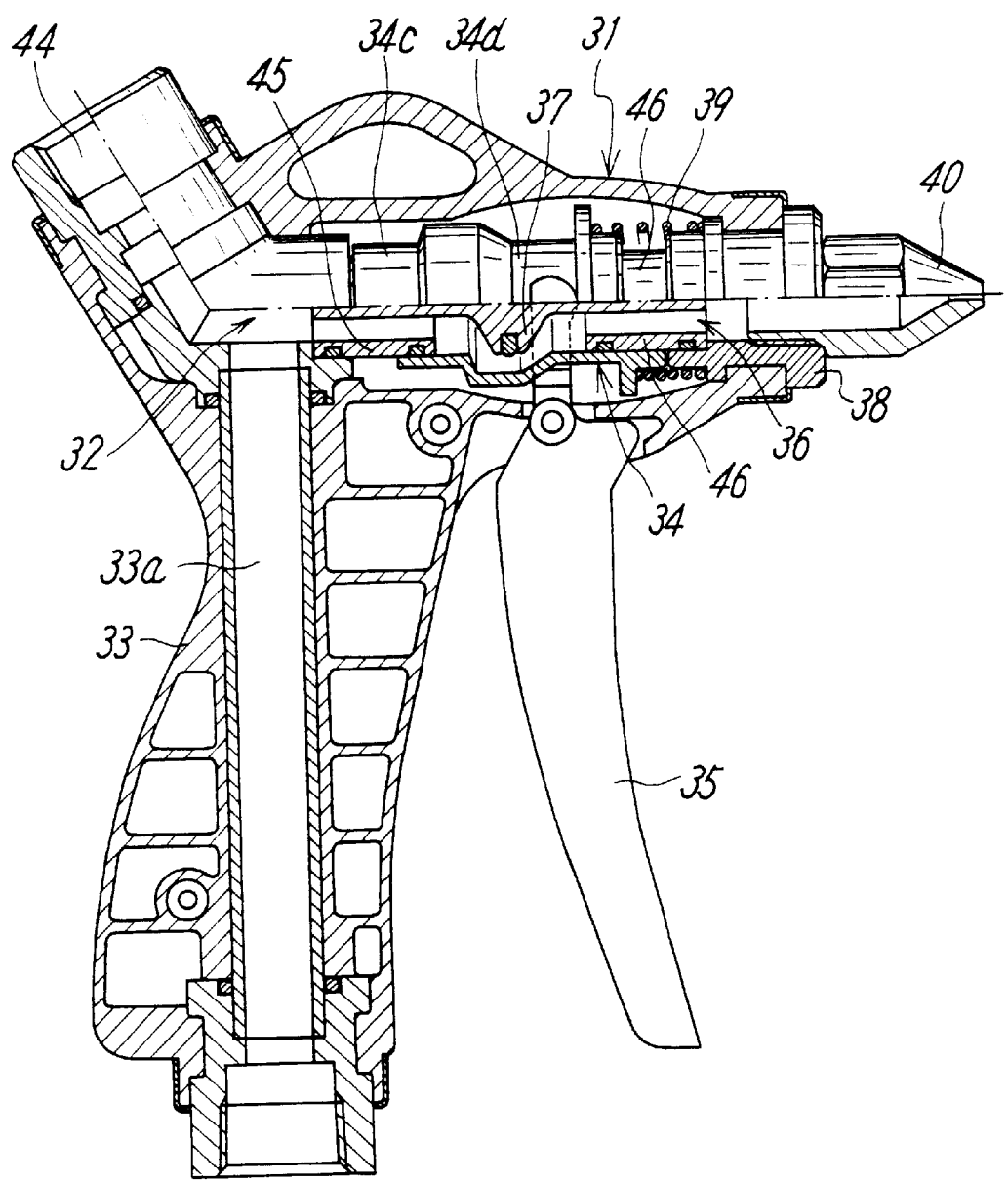
FIG. 8 is a sectional view of a third embodiment of the invention. Here, an upper half of a barrel portion shows a closed state of a valve and a lower half shows an open state of the valve.
Figure 9:
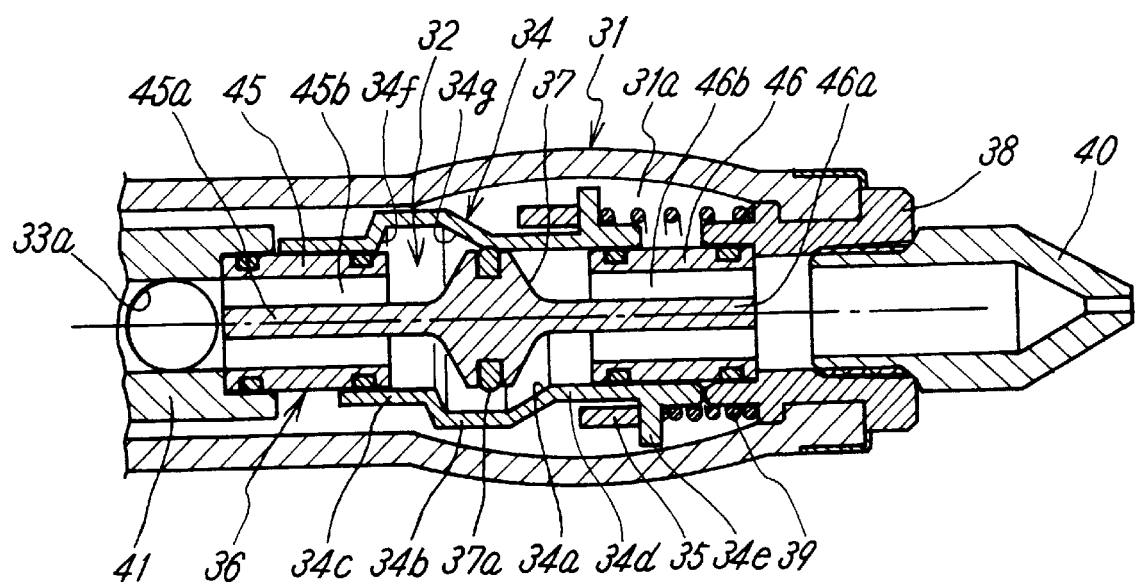
FIG. 9 is a sectional view of an essential portion of the third embodiment. Here, an upper half of the barrel portion shows the closed state of the valve and a lower half shows the open state of the valve.

FIGS. 8 and 9 show a third embodiment and a fluid squirt gun of the embodiment is different from the first and second embodiments in structures of a valve seat and a valve element. In other words, though the annular valve seat 7 is opened and closed with the valve element 4, 20 having the disc-shaped valve portion 14, 21 in the first and second embodiments, a disc-shaped valve seat 37 is opened and closed with a cylindrical valve element 34 having an annular valve portion 34a at an inner peripheral face of the valve element 34 in the third embodiment.

To put it concretely, the fluid squirt gun of the third embodiment includes a handle 33 having inside thereof a supply path 33a, a barrel 31 on a base end side of which the handle 33 is connected, the hollow cylindrical valve element 34 provided for sliding in an axial direction in the barrel 31, the substantially disc-shaped valve seat 37 positioned in the valve element 34, a trigger 35 for driving the valve element 34, an annular connecting member 38 mounted to a tip end of the barrel 31, a spring 39 for valve-closing operation and provided between the connecting member 38 and the valve element 34, and a nozzle 40 mounted to the connecting member 38. An opening 44 open upward on the base end side of the barrel 31 is a fluid supply hole used when fluid is supplied without using the supply path 33a.

The valve seat 37 is connected to first and second connecting pipes 45 and 46 through shafts 45a and 46a extending in an axial direction of the flow path from central portions of opposite faces of the valve seat 37. By respectively and airtightly fitting and fixing the connecting pipes 45 and 46 to a flow path pipe 41 mounted in the flow path 32 and the connecting member 38, the valve seat 37 is coaxially disposed in a central portion of the flow path 32. An annular sealing member 37a is mounted to an outer periphery of the valve seat 37 and forms a seat portion with which the valve portion 34a of the valve element 34 comes in contact by the sealing member 37a.

The first connecting pipe 45 and the second connecting pipe 46 have the same diameters and the shafts 45a and 46a are fixed to the central portions of the pipes 45 and 46 by a plurality of thin-plate-shaped bridges 45b and 46b positioned radially. The connecting pipes 45 and 46, the shafts 45a and 46a, and the valve seat 37 form a valve seat member 36.

The valve element 34 includes small-diameter portions 34c and 34d positioned on axial opposite sides and a large-diameter portion 34b positioned between the small-diameter portions. The small-diameter portions 34c and 34d are respectively and airtightly fitted for sliding over outer peripheries of the connecting pipes 45 and 46 to thereby dispose the valve element 34 such that the valve element 34 can move in the axial direction of the flow path 32. The valve element 34 and the connecting pipes 45 and 46 form a part of the flow path 32 extending from the supply path 33a or the fluid supply hole 44 through the flow path pipe 41 to the nozzle 40.

The small-diameter portions 34c and 34d have substantially the same in side diameters as a seat diameter of the valve seat 37 and the large-diameter portion 34b has a larger inside diameter. A part of the one small-diameter portion 34d positioned downstream from the large-diameter portion 34b forms the valve portion 34a for opening and closing the valve seat 37 from a downstream side. As shown in an upper half of FIG. 9, the valve is closed when the valve portion 34a comes in contact with the sealing member 37a of the valve seat 37. As shown in a lower half of FIG. 9, the valve is opened when the valve element 34 is displaced downstream and the valve seat 37 is positioned in the large-diameter portion 34b, and fluid flows through the flow path between an outer periphery of the valve seat 37 and an inner periphery of the large-diameter portion 34b. To be exact, the valve portion 34a is formed at an edge portion where the large-diameter portion 34b and the small-diameter portion 34d are connected to each other.

In the barrel 31, an operating chamber 31a sealed from the flow path 32 is formed around the valve element 34 and the connecting pipes 45 and 46. A projecting portion 34e formed at an outer periphery of the valve element 34 is disposed in the operating chamber 31a and one end side of the trigger 35 is in contact with the projecting portion 34e.

The large-diameter portion 34b has pressure receiving faces 34f and 34g inclined in directions opposite to each other between the small-diameter portions 34c and 34d on opposite sides of the large-diameter portion 34b. Inclination angles of the pressure receiving faces 34f and 34g are different from each other. The pressure receiving face 34g positioned between the large-diameter portion 34b and the downstream small-diameter portion 34d faces an upstream side and is a forward pressure receiving face for applying fluid pressure operating force in a valve-opening direction to the valve element 34. On the other hand, the pressure receiving face 34f positioned between the large-diameter portion 34b and the upstream small-diameter portion 34c faces a downstream side and is a reverse pressure receiving face for applying fluid pressure operating force in a valve-closing direction to the valve element 34. In the pressure receiving faces 34f and 34g, the inclination angle of the forward pressure receiving face 34g is smaller than that of the reverse pressure receiving face 34f but areas in a direction orthogonal to the axis of the flow path 32 are substantially the same as each other. Therefore, components in the axial direction of the flow path of the fluid pressure operating forces acting on both the pressure receiving faces 34f and 34g in valve closing are the same as each other and a closed state of the valve element 34 is substantially maintained by only biasing force of the spring 39.

In the fluid squirt gun of the first and second embodiments, fluid pressure does not affect the operating force of the trigger and the valve can be opened against the repulsing force of the spring in valve-opening operation. However, because back pressure of the nozzle 12 acts on the valve element after valve opening, the fluid squirt gun of the first and second embodiments is suitable for use in intermittent opening and closing of the valve in a relatively short cycle or in continuous opening of the valve when the back pressure is small. In the fluid squirt gun of the third embodiment, on the other hand, force of the back pressure does not act on the valve element 34 in the axial direction of the flow path, even if the back pressure is generated in the nozzle 40 due to squirting of the fluid. Therefore, the fluid squirt gun of the third embodiment is suitable for use in continuous squirting of the fluid without being affected by the back pressure.

As described above in detail, in the fluid squirt gun of the invention, the seating force for pressing the valve element against the valve seat can be obtained by only the repulsing force of the spring irrespective of pressure of the fluid. Therefore, the seating force is not affected by variations in the fluid pressure and, as a result, the stable closed state of the valve can be achieved and durability is enhanced.

What is claimed is:

1. A fluid squirt gun comprising a linear flow path provided in a barrel, a nozzle at a tip end of said flow path, a valve seat provided in said flow path, a valve element disposed for movement in an axial direction of said flow path to open and close said valve seat, a spring for pressing said valve element in a valve-closing direction, and a trigger for opening and closing said valve element, wherein said valve element includes a forward pressure receiving face on which fluid in said flow path acts in a valve-opening direction in a closed state of a valve and a reverse pressure receiving face on which said fluid acts in said valve-closing direction in said closed state of said valve and both said pressure receiving faces have substantially equal pressure receiving areas, and wherein said valve element includes a received pressure adjusting portion for sliding in a sealed state in said flow path in a position upstream from said valve seat, a valve portion for opening and closing said valve seat from a downstream side, a stem connecting said valve portion and said received pressure adjusting portion, and a through hole provided in said received pressure adjusting portion to connect a flow path portion upstream from said received pressure adjusting portion and a flow path portion downstream from said received pressure adjusting portion and said forward pressure receiving face and said reverse pressure receiving face are formed such that fluid pressure operating force in said valve-closing direction and generated by said received pressure adjusting portion and fluid pressure operating force in said valve-opening direction and acting on said stem and said valve portion are equal to each other.

2. A fluid squirt gun according to claim 1, wherein said barrel has an operating chamber sealed from said flow path around said flow path, a part of said received pressure adjusting portion of said valve element is disposed in said operating chamber, and said trigger is contact with said part.

3. A fluid squirt gun according to claim 1,
wherein said received pressure adjusting portion has a pressure receiving face facing an upstream side and a pressure receiving face facing a downstream side in said flow path, said forward pressure receiving face is formed of said pressure receiving face of said received pressure adjusting portion facing said upstream side and pressure receiving faces of said stem and said valve portion, and said reverse pressure receiving face is formed of said pressure receiving face of said received pressure adjusting portion facing said downstream side.

4. A fluid squirt gun according to claim 3, wherein said received pressure adjusting portion includes a small-diameter portion for forming said pressure receiving face facing said upstream side and a large-diameter portion for forming said pressure receiving face facing said downstream side.

5. A fluid squirt gun according to claim 1, wherein said small-diameter portion of said received pressure adjusting portion and said valve portion have substantially the same diameters.

6. A fluid squirt gun comprising a linear flow path provided in a barrel, a nozzle at a tip end of said flow path, a valve seat provided in said flow path, a valve element disposed for movement in an axial direction of said flow path to open and close said valve seat, a spring for pressing said valve element in a valve-closing direction, and a trigger for opening and closing said valve element,
wherein said valve element includes a forward pressure receiving face on which fluid in said flow path acts in a valve-opening direction in a closed state of a valve and a reverse pressure receiving face on which said fluid acts in said valve-closing direction in said closed state of said valve and both said pressure receiving faces have substantially equal pressure receiving areas, and
wherein said valve seat is in a disc shape, has an annular seat portion at an outer periphery of said valve seat, and disposed concentrically with said flow path in a central portion of said flow path,
said valve element is in a hollow tubular shape, has small-diameter portions having inside diameters substantially the same as a seat diameter of said valve seat on axial opposite sides of said valve element and a large-diameter portion having an inside diameter larger than said seat diameter between said small-diameter portions, is disposed in such a position as to surround said valve seat to be movable in said axial direction of said flow path, has a valve portion formed of said small-diameter portion positioned downstream from said large-diameter portion and said forward pressure receiving face and said reverse pressure receiving face on an inner face of said large-diameter portion.

7. A fluid squirt gun according to claim 6, wherein said barrel has an operating chamber sealed from said flow path around said flow path, a projecting portion formed on an outer periphery of said valve element is disposed in said operating chamber, said trigger and said spring are in contact with said projecting portion.

* * * * *